(12) United States Patent
Chiba

(10) Patent No.: US 10,783,853 B2
(45) Date of Patent: Sep. 22, 2020

(54) IMAGE PROVISION DEVICE, METHOD AND PROGRAM THAT ADJUSTS EYE SETTINGS BASED ON USER ORIENTATION

(71) Applicant: Rakuten, Inc., Tokyo (JP)

(72) Inventor: Naoki Chiba, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 16/346,165

(22) PCT Filed: Nov. 2, 2016

(86) PCT No.: PCT/JP2016/082600
§ 371 (c)(1),
(2) Date: Apr. 30, 2019

(87) PCT Pub. No.: WO2018/083757
PCT Pub. Date: May 11, 2018

(65) Prior Publication Data
US 2019/0371278 A1    Dec. 5, 2019

(51) Int. Cl.
*G09G 5/373*    (2006.01)
*G06T 3/40*    (2006.01)

(52) U.S. Cl.
CPC ............... *G09G 5/373* (2013.01); *G06T 3/40* (2013.01); *G09G 2340/045* (2013.01); *G09G 2354/00* (2013.01)

(58) Field of Classification Search
None
See application file for complete search history.

(56) References Cited

U.S. PATENT DOCUMENTS

| 2012/0098926 A1* | 4/2012 | Kweon ..................... G06T 1/00 348/36 |
| 2015/0227196 A1 | 8/2015 | Fujii et al. |
| 2016/0282619 A1* | 9/2016 | Oto ....................... G02B 27/017 |
| 2019/0005613 A1* | 1/2019 | Ogura ....................... G06T 3/40 |

FOREIGN PATENT DOCUMENTS

| JP | 2014-38523 A | 2/2014 |
| JP | 2015-95045 A | 5/2015 |
| JP | 2016-24751 A | 2/2016 |

OTHER PUBLICATIONS

International Search Report for PCT/JP2016/082600, dated Feb. 7, 2017.

\* cited by examiner

*Primary Examiner* — Vu Nguyen
(74) *Attorney, Agent, or Firm* — Sughrue Mion, PLLC

(57) ABSTRACT

An image provision device (100) displays on a field-of-vision covering display (192) an image obtained by trimming all-surroundings image data (21). A detector (11) detects an orientation or a change in the orientation of a user's head or sight line by means of a sensor (191). A direction setter (12) sets an eye direction to the all-surroundings image data (21) in accordance with the detected orientation or change in the orientation. An extractor (13) obtains a zoomed image by trimming and zooming part of the all-surroundings image with a zoom factor that depends on an angle formed between the set eye direction and a predetermined direction in the all-surroundings image data (21). A displayer (14) displays the obtained zoomed image on a display (192).

7 Claims, 9 Drawing Sheets

AMOUNT OF FOCUS ADJUSTMENT

IMAGE PROVISION DEVICE, METHOD AND PROGRAM THAT ADJUSTS EYE SETTINGS BASED ON USER ORIENTATION

This Application is a National Stage of International Application No. PCT/JP2016/082600 filed Nov. 2, 2016, the entirety of which is incorporated herein by reference.

TECHNICAL FIELD

The present disclosure relates to an image provision device, an image provision method, a program, and a non-transitory computer-readable information recording medium that are suitable for reducing a feeling of strangeness to be given to a user when an observation space that changes with the orientation of the user's head or sight line is presented on a field-of-vision covering display.

BACKGROUND ART

In recent years, substituted reality systems have been proposed to manipulate recognition of a user such that the user believes that an event, which is not occurring in reality in front of the user, is occurring in front of the user (see Patent Literature 1). Researches are also promoted on other technologies similar to substituted reality systems, such as virtual reality systems and augmented reality systems. For substituted reality, virtual reality, augmented reality, and the like, an observation space that is different from a real space is prepared. Such observation space is constructed by using panoramic or omnidirectional pictures recorded at different locations, times, or the like in combination with a technique for three-dimensional graphics modeling.

These technologies involve generating, through perspective projection or clipping of a picture, an image showing an observation space as seen from an observation position in an observation direction and presenting the image on a field-of-vision covering display such as a head-mounted display. A change in orientation of the user's head or sight line is detected by a sensor or the like, and the observation direction is updated in response to the detected change in orientation of the head.

CITATION LIST

Patent Literature

Patent Literature 1: Unexamined Japanese Patent Application Kokai Publication No. 2014-38523

SUMMARY OF INVENTION

Technical Problem

However, conventional technologies sometimes bring a feeling of strangeness to the user when an observation space is displayed on a head-mounted display or the like in response to a change in orientation of the user's head or sight line.

In a real space, when the user looks down around the user's feet, the user sees a psychologically smaller world in the user's field of vision. This is a psychological effect produced on the basis that, for example, the field of view is filled with objects closer to the user and that the eye lens has a shorter focusing effect due to the closer objects. However, there has been no head-mounted display that is produced in view of such effect. In other words, conventional head-mounted displays show images merely by clipping an image based on a given orientation. As a result, the user may sometimes have a false perception that the user is floating above the floor when the user looks down around the user's feet.

The present disclosure has been created in view of these problems. In other words, an objective of the present disclosure is to reduce a feeling of strangeness to be given by a field-of-vision covering display to the user.

Solution to Problem

To achieve the above-described objective, an image provision device according to a first aspect of the present disclosure is:

an image provision device that displays an image obtained from an all-surroundings image on a field-of-vision covering display, wherein the image provision device detects an orientation or a change in the orientation of a user;

sets an eye direction to the all-surroundings image, based on the detected orientation or change in the orientation;

obtains a zoomed image by trimming part of the all-surroundings image with a zoom factor that depends on an angle formed between the set eye direction and a predetermined direction in the all-surroundings image and zooming the part of the all-surroundings image in accordance with a size or resolution of the display; and displays the obtained zoomed image on the display.

The image provision device according to the first aspect of the present disclosure may trim and zoom part of the all-surroundings image with the zoom factor that is higher as the angle formed between the set eye direction and the predetermined direction in the all-surroundings image is smaller.

In the image provision device according to the first aspect of the present disclosure, an amount of focus adjustment corresponding to an eye direction may be recorded in the all-surroundings image, and the image provision device may trim and zoom part of the all-surroundings image with the zoom factor that depends on the angle and on the amount of focus adjustment corresponding to the set eye direction.

The image provision device according to the first aspect of the present disclosure may trim and zoom part of the all-surroundings image with the zoom factor that depends on the angle and on a numerical value representing a body height of the user wearing the display.

The image provision device according to the first aspect of the present disclosure may detect a height of the display; and trim and zoom part of the all-surroundings image with the zoom factor that depends on the angle and on the detected height.

To achieve the above-described objective, an image provision method according to a second aspect of the present disclosure is an image provision method including displaying an image obtained from an all-surroundings image on a field-of-vision covering display, wherein an image provision device detects an orientation or a change in the orientation of a user, wherein the image provision device sets an eye direction to the all-surroundings image, based on the detected orientation or change in the orientation, wherein the image provision device obtains a zoomed image by trimming part of the all-surroundings image with a zoom factor that depends on an angle formed between the set eye direction and a predetermined direction in the all-surroundings image and zooming the part of the all-surroundings image in accordance with a size or resolution of the display, and wherein the image provision device displays the obtained zoomed image on the display.

To achieve the above-described objective, a program according to a third aspect of the present disclosure is a program executed by a computer that displays an image obtained from an all-surroundings image on a field-of-vision covering display, the program causing the computer to execute:

a detecting step of detecting an orientation or a change in the orientation of a user;

a setting step of setting an eye direction to the all-surroundings image, based on the detected orientation or change in the orientation;

an extracting step of obtaining a zoomed image by trimming part of the all-surroundings image with a zoom factor that depends on an angle formed between the set eye direction and a predetermined direction in the all-surroundings image and zooming the part of the all-surroundings image in accordance with a size or resolution of the display; and a displaying step of displaying the obtained zoomed image on the display.

To achieve the above-described objective, an information recording medium according to a fourth aspect of the present disclosure is a non-transitory computer-readable information recording medium recording a program executed by a computer that displays an image obtained from an all-surroundings image on a field-of-vision covering display, the program causing the computer to execute:

a detecting step of detecting an orientation or a change in the orientation of a user;

a setting step of setting an eye direction to the all-surroundings image, based on the detected orientation or change in the orientation;

an extracting step of obtaining a zoomed image by trimming part of the all-surroundings image with a zoom factor that depends on an angle formed between the set eye direction and a predetermined direction in the all-surroundings image and zooming the part of the all-surroundings image in accordance with a size or resolution of the display; and a displaying step of displaying the obtained zoomed image on the display.

Advantageous Effects of Invention

According to the present disclosure, a field-of-vision covering display that reduces a feeling of strangeness to be given to users can be provided.

DESCRIPTION OF EMBODIMENTS

Figure 1:
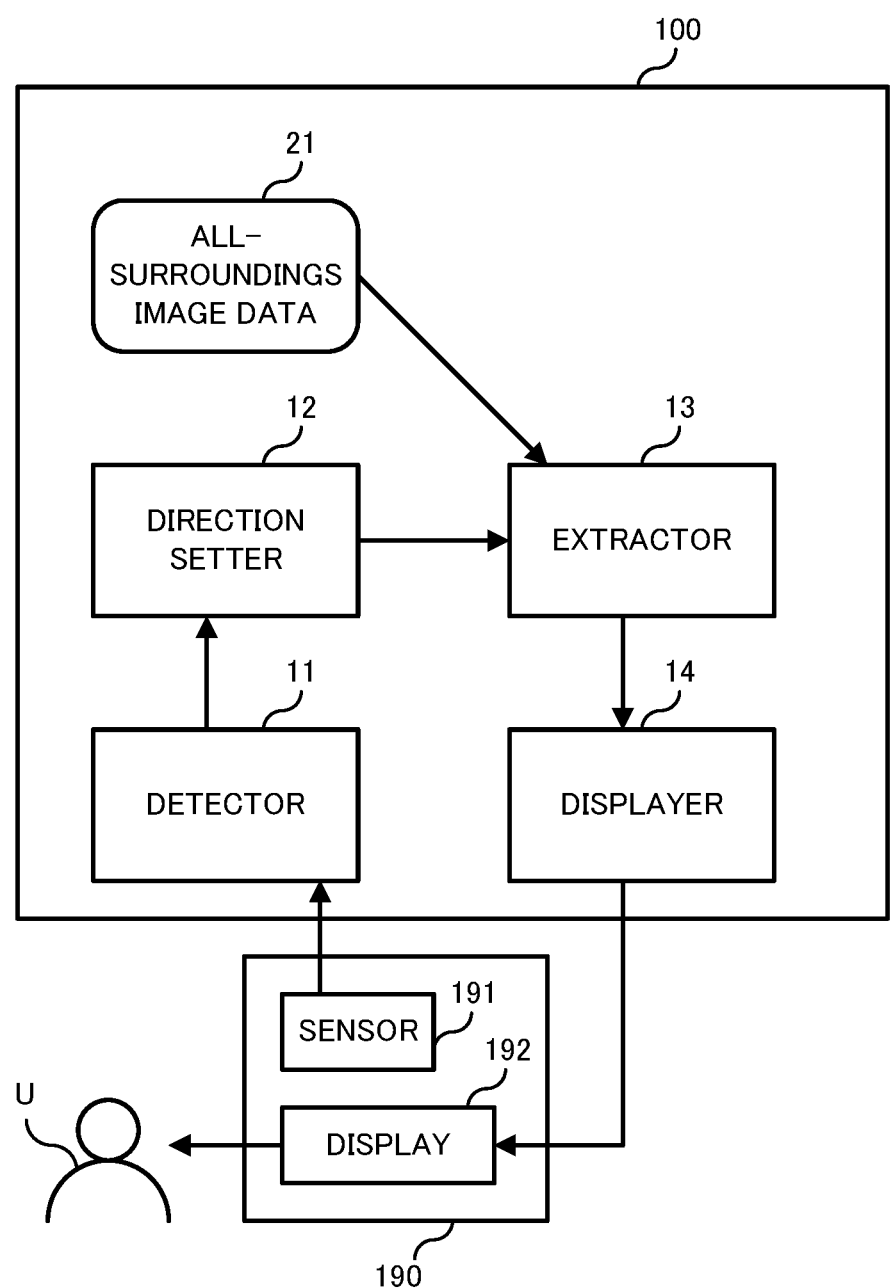
FIG. 1 is a block diagram illustrating a functional configuration of an image provision device according to Embodiment 1.

Embodiments of the present disclosure will now be described. The embodiments are presented for explanatory purposes only and do not limit the scope of the present disclosure. Therefore, persons skilled in the art can adopt embodiments in which any or all of the elements in the following embodiments are replaced with equivalents thereof, and such adopted embodiments are included in the scope of the present disclosure.

Embodiment 1

An image provision device 100 according to Embodiment 1 of the present disclosure provides images to a field-of-vision covering display 190 connected to the image provision device 100. Although the following description takes a head-mounted display as an example of the field-of-vision covering display 190, other devices may be employed as the field-of-vision covering display 190, including, for example, a device that projects an image on the retina of a human being and a display device called smart glasses shaped into eye glasses. The following examples are described with a head-mounted display taken as an example of the field-of-vision covering display 190. Thus, the head-mounted display is given a symbol "190" for reference. A user U wears the head-mounted display 190 on the head of the user and can view images displayed on the head-mounted display 190.

The head-mounted display 190 includes a sensor 191 that detects the orientation or a change in the orientation of the display device itself. The head-mounted display 190 sends data detected by the sensor 191 to the image provision device 100. Via the sensor 191, the image provision device 100 can identify the current direction (eye direction) in which the user U wearing the display device is looking.

The image provision device 100 holds all-surroundings image data, which is the source of images to be presented to the user U. The all-surroundings image data, as used herein and also known as an omnidirectional image, refers to a single piece of recorded data in which images taken from a certain shooting point in a wide range of angles are collected together.

Several methods are available for taking an image of surroundings in the real world in the form of all-surroundings image data. For example, image data taken by a fisheye camera (a camera employing a fisheye lens, which can converge light given in a wider range of angles compared with a normal lens) can be used as the all-surroundings image. Alternatively, the all-surroundings image data can be generated by combining a plurality of images taken from a single shooting point in different directions.

Note that an all-surroundings image represents data that includes images taken at wider shooting angles than general images, and an all-surroundings image may not necessarily cover all angles. Specific examples of the all-surroundings image used herein include an image taken from a certain point at an angle of 180° (although the angle is not 360° and the image does not include pictures covering the whole surroundings).

Based on the information sent from the sensor in the head-mounted display 190, the image provision device 100 identifies the user U's eye direction in the all-surroundings image data that is stored in the image provision device 100. Based on the identified eye direction, the image provision device 100 trims the all-surroundings image data into an image seen at an angle approximate to a human angle of view. Note that the image trimming may also be called clipping or cropping.

Then, the image provision device 100 adjusts the trimmed image so that the image is suited to the width and height in units of pixels of the display 192 in the head-mounted display 190 and the size and resolution of the display 192, and displays the adjusted image. The image adjusted as above is hereinafter called a zoomed image.

When the user U wearing the head-mounted display 190 changes the orientation of the user's head, the orientation of the head-mounted display 190 also changes accordingly. Then, the image provision device 100 identifies the eye direction of the user U based on the change in orientation, and again displays, on the head-mounted display 190, a zoomed image resulting from the trimming and zooming based on the eye direction.

Such mechanism enables the image provision device 100 to display, when the user U changes the orientation of the user's head, a different image on the head-mounted display 190 in accordance with the change in orientation. For example, when the user U turns the user's head upward from the current orientation, the image provision device 100 displays an image, which corresponds to an orientation upward from the current orientation, in the all-surroundings image data. The image provision device 100 presents images to the user U in response to movement of the user U, whereby the user U sees pictures through the head-mounted display 190 to feel as if the pictures were showing a real space surrounding the user U.

As illustrated in FIG. 1, the image provision device 100 according to Embodiment 1 of the present disclosure functionally includes a detector 11, a direction setter 12, an extractor 13, and a displayer 14. The image provision device 100 further includes a mechanism for holding all-surroundings image data 21, which is to be read when needed.

The image provision device 100 is connected to the head-mounted display 190. The head-mounted display 190 includes the display 192 that presents pictures to the user U and the sensor 191 that detects the orientation or a change in the orientation of the head-mounted display 190. The image provision device 100 displays an image on the display 192 while receiving data indicating the orientation (or a change in the orientation) from the sensor 191.

The detector 11 detects the orientation or a change in the orientation of the head-mounted display 190. The detector 11 detects the orientation or a change in the orientation of the head-mounted display 190 on the basis of the data supplied by the sensor 191. The orientation of the head-mounted display 190 detected as above is opposite to the orientation of the user U (specifically, the orientation of the user U is an orientation pointed forward from the center of the user's head).

Although FIG. 1 shows that the image provision device 100 and the head-mounted display 190 are separate devices, these devices may be integrated into a single device. For example, a device similar to the head-mounted display 190 may be built by mounting a general-purpose device, such as a smart phone, a tablet computer, or a phablet, which is a tablet computer serving as a mobile phone, to an attachment. In this case, a program causing a smart phone or a similar computer to function as the aforementioned components is executed on such smart phone or computer.

In addition, any other display that covers the field of vision of the user may be employed as described above. For example, instead of using the head-mounted display 190 worn on the head of the user, smart glasses in the shape of eye glasses with a display placed in front of the user's eye supported by a temple extending from the user's ear may be used. Smart glasses can detect the orientation of the smart glasses by using an acceleration sensor, and can estimate the orientation by tracking images captured by a camera that takes images of the outside world.

Instead of the head-mounted display 190, a device that directly projects pictures onto the user's retina may also be employed. In this case, the orientation of the user can be detected from the user's eye movement, or an acceleration sensor or the like may alternatively be used.

The direction setter 12 sets an eye direction of the user U in the all-surroundings image data, in accordance with the detected orientation or change in the orientation. In the case where the detector 11 detects orientations, the direction setter 12 sets the eye direction in the all-surroundings image data, the eye direction corresponding to the detected orientation of the head-mounted display 190, based on a mapping between the direction detected by the detector 11 and the direction in the all-surroundings image data. In the case where the detector 11 detects changes in orientation, the direction setter 12 sets a new eye direction in the all-surroundings image data, based on the amount of change in direction detected by the detector 11 and on the previously set eye direction in the all-surroundings image data.

The extractor 13 generates image data representing a zoomed image by trimming and zooming part of an image represented by the all-surroundings image data with a zoom factor that depends on an angle formed between the eye direction that has been set by the direction setter 12 and a predetermined direction in the all-surroundings image data and in accordance with the size or resolution of the display 192.

The displayer 14 shows the zoomed image extracted by the extractor 13 on the display 192 of the head-mounted display 190.

As a result of operations of these functional components (the detector 11, the direction setter 12, the extractor 13, and the displayer 14), the display 192 shows the zoomed image that is located in a direction corresponding to the eye direction of the user U and that is extracted from the all-surroundings image data. When the user U changes the orientation of the user's head (to change the eye direction), the image provision device 100 follows the movement of the head to obtain a zoomed image located in a direction corresponding to the new eye direction, and shows the zoomed image on the display 192.

In addition, through operations of the extractor 13, the image provision device 100 sets a zoom factor that depends on an angle formed between the eye direction set by the direction setter 12 and a predetermined direction in the all-surroundings image data. During a trimming process, the image provision device 100 trims and zooms the image with the zoom factor that has been set. The trimming and the zooming may take place simultaneously, or either one may follow the other.

For example, to acquire a zoomed image from the all-surroundings image data in accordance with the number of pixels, size, and resolution of the display 192, a coordinate transformation, such as a perspective projection transformation, is performed to transform coordinates of the image data. During this process, the distance between the observation point for projection and the projection plane on which individual pixels on the display 192 are positioned, or the focal length of a lens that would be used for the transformation may be changed in conjunction with the zoom factor, followed by projecting the image data onto the projection plane, whereby the trimming and the zooming can be performed simultaneously.

Furthermore, any available library or the like may be directly used to transform the all-surroundings image data into an image to be shown on the display 192. In this case, a zoomed image can be obtained by trimming and zooming, with a zoom factor that depends on the eye direction, a center area of the result (two-dimensional image data for use on the screen as obtained from the all-surroundings image data) of the image transformation performed by using a library or the like. It is desirable to apply any of various smoothing techniques to the zooming.

Consequently, when the user U changes the orientation of the user's head, the image provision device 100 changes not only the eye direction in the all-surroundings image data but also the zoom factor to display a trimmed and zoomed image. Therefore, for example, when the user U faces in another direction closer to a predetermined direction (like a direction toward the user's feet), the image provision device 100 can display an enlarged (or reduced) image so as to reduce a feeling of strangeness given to the user U.

Figure 2:
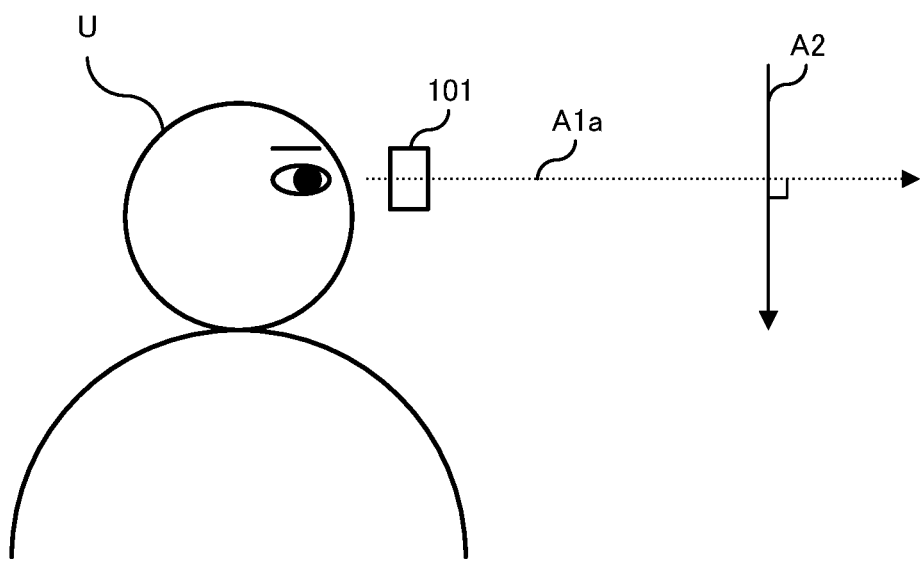
FIG. 2 illustrates an example of a relationship between an eye direction and a predetermined direction.
Figure 3:
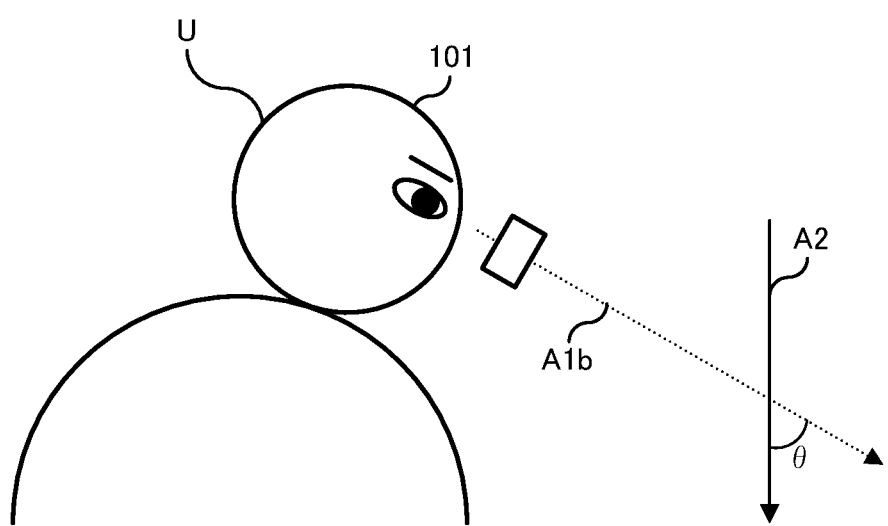
FIG. 3 illustrates an example of a relationship between an eye direction and a predetermined direction.

By way of example, the following describes a relationship between the position of the screen 101 on the display 192 and the eye direction of the user U wearing the head-mounted display 190, referring to FIGS. 2 and 3. It is assumed here that the predetermined direction is set to a vertically downward direction in the image provision device 100.

FIG. 2 illustrates the user U facing in a horizontal direction. In the example illustrated in FIG. 2, the user U looks in the direction indicated by the line A1a, and the detector 11 detects the direction indicated by the line A1a as the eye direction. The detected eye direction forms a right angle with the predetermined direction indicated by the line A2 (that is, the vertically downward direction). In this case, the image provision device 100 detects that an angle ($\theta$) formed between the set eye direction and the predetermined direction is 90°.

FIG. 3 illustrates the user U facing in a relatively downward direction. In the example illustrated in FIG. 3, the user U looks in the direction indicated by the line A1b, and the detector 11 detects the direction indicated by the line A1b as the eye direction. The detected eye direction forms an angle $\theta$ with the predetermined direction indicated by the line A2. In this case, the image provision device 100 detects that an angle formed between the set eye direction and the predetermined direction is $\theta$.

The image provision device 100 sets a zoom factor based on the detected angle $\theta$. For a smaller detected angle $\theta$, the image provision device 100 sets the zoom factor to a greater value. Hence, when the user U looks down around the feet of the user U, the display 192 shows an enlarged image compared with an image shown when the user U is looking in a horizontal direction.

In general, when the user U looks down around the feet of the user U, the user U sees a psychologically smaller world in the field of vision of the user U. This is a psychological effect produced on the basis that, for example, the field of view is filled with objects closer to the user and that the eye lens has a shorter focusing effect due to the closer objects. Thus, when the user U is looking around the feet of the user U, the user U may sometimes have a false perception that the user is floating above the floor and experience a feeling of strangeness if the user U sees an image trimmed with the same zoom factor as that for a horizontal direction.

The image provision device 100 according to the present embodiment sets a zoom factor that depends on an angle $\theta$ formed between the eye direction of the user U and the predetermined direction (horizontally downward direction), and trims part of the all-surroundings image data with the zoom factor to display the resulting image. Therefore, when the user U looks down around the feet of the user U, an enlarged image is presented so as to reduce a feeling of strangeness to be given to the user.

Figure 4:
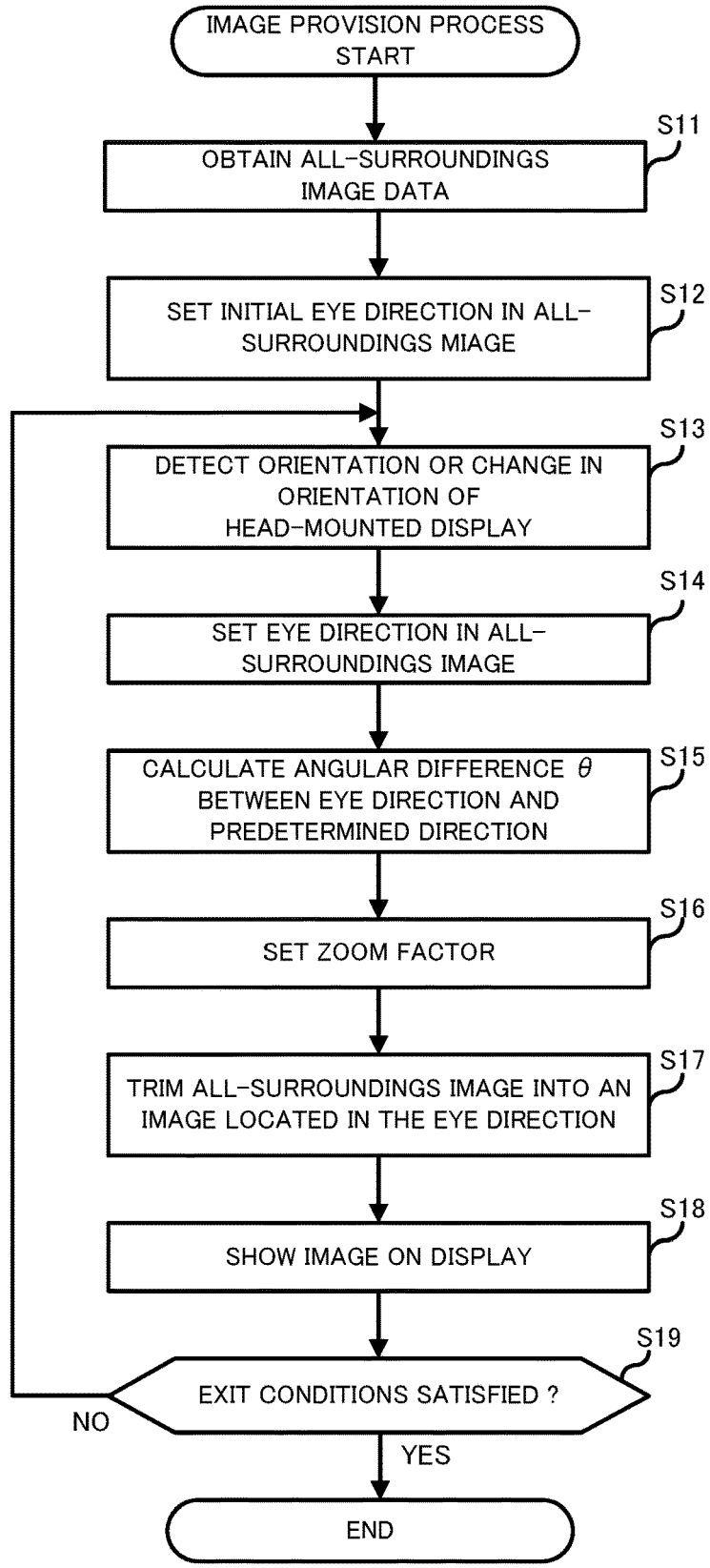
FIG. 4 is a flowchart illustrating an image provision process.

The image provision device 100 displays an image on the display 192 by carrying out an image provision process illustrated in FIG. 4. The image provision device 100 starts the image provision process triggered by the user U putting on and powering on the head-mounted display 190. The image provision process will now be described with reference to FIG. 4.

Upon start of the image provision process, the image provision device 100 obtains the all-surroundings image data (step S11). The image provision device 100 reads out an image recorded as the all-surroundings image data 21.

Next, the image provision device 100 sets an initial eye direction in the all-surroundings image data that has been read out (step S12). The detector 11 detects a direction in which the head-mounted display 190 faces, and the image provision device 100 sets the eye direction corresponding to the detected direction. Alternatively, the image provision device 100 may use an initial direction preset in the all-surroundings image data as the initial eye direction.

Next, the image provision device 100 detects the orientation or a change in the orientation of the head-mounted display 190 (step S13). Through operations of the detector 11, the image provision device 100 detects the orientation or a change in the orientation of the head-mounted display 190.

Then, the image provision device 100 sets an eye direction in the all-surroundings image data in accordance with the detected orientation or change in the orientation (step S14). The image provision device 100 sets a new eye direction to the all-surroundings image data, based on a mapping between the detected orientation or change in the orientation and the previously set eye direction.

Next, the image provision device 100 calculates an angular difference $\theta$ between the set eye direction and the predetermined direction (step S15). The image provision device 100 calculates an angular difference between the eye direction that has been set in step S14 and the predetermined direction, and records the angular difference designated as $\theta$.

Based on the calculated angular difference $\theta$, the image provision device 100 sets a zoom factor (step S16). The image provision device 100 sets the zoom factor based on the $\theta$ calculated in step S15 and on a mapping for calculating a zoom factor.

Next, the image provision device 100 trims the all-surroundings image data into an image located in the eye direction (step S17). With the zoom factor calculated in step S16, the image provision device 100 extracts the image located in the direction that has been set in step S14 from the all-surroundings image data.

The image provision device 100 then displays the image extracted in step S17 on the display 192 (step S18). In step S18, an image dependent on the orientation of the head-mounted display 190 is displayed on the display 192.

After step S18, the image provision device 100 determines whether exit conditions are satisfied (step S19). If it is determined that the conditions are not satisfied (NO in step S19), the image provision device 100 returns the processing to step S13 and carries out the steps starting from step S13 to detect the orientation and display an image again. If it is determined that the conditions are satisfied (YES in step S19), the image provision device 100 exits the image provision process.

Figure 5:
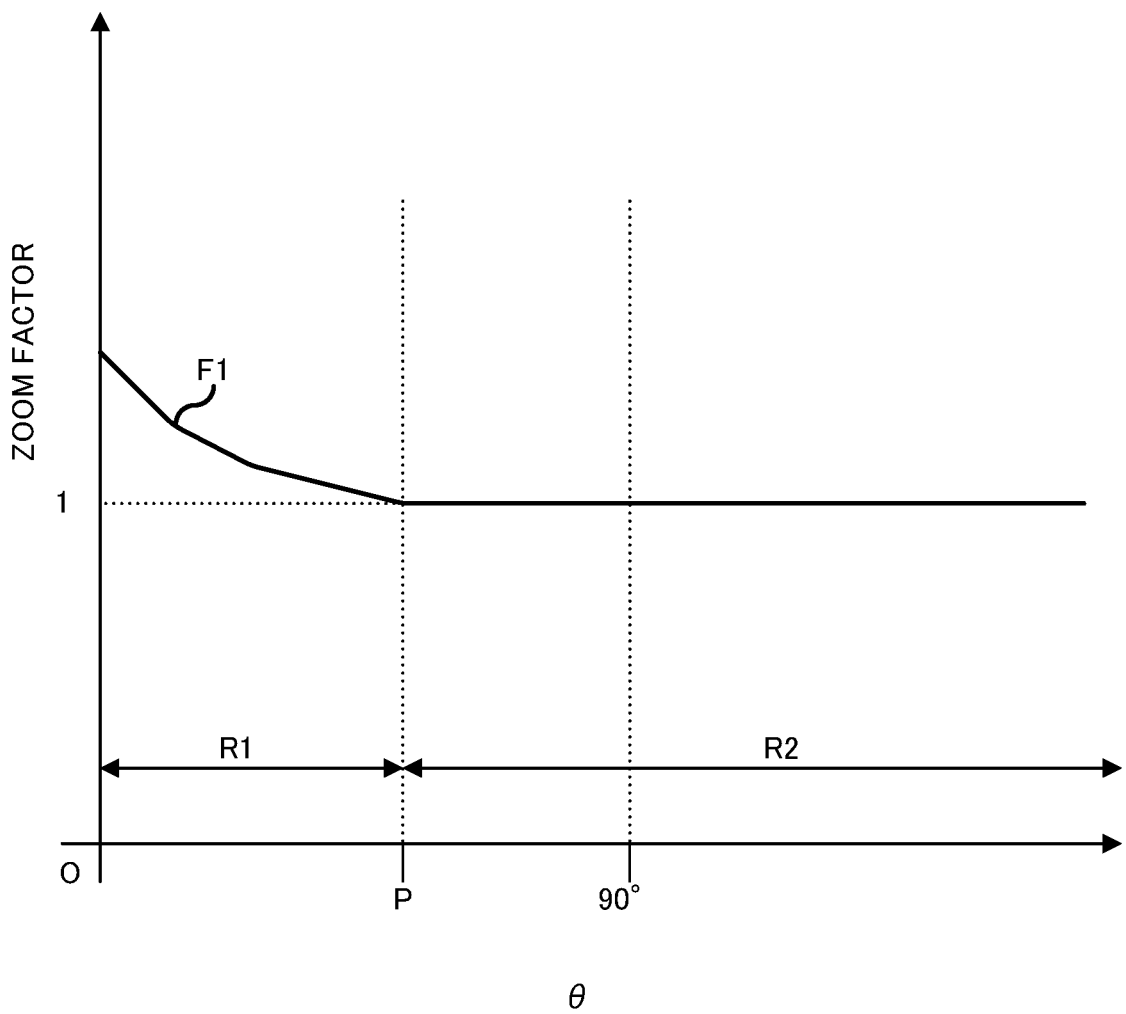
FIG. 5 illustrates an example of a correspondence between zoom factors and angles θ.

FIG. 5 shows an example of a relationship between zoom factors set by the image provision device 100 and angular differences θ. The figure shows a function F1 expressing zoom factor values, where the horizontal axis indicates angles θ and the vertical axis indicates their corresponding zoom factor values.

In the example illustrated in FIG. 5, the image provision device 100 sets the zoom factor to 1 for θ values not less than 90° (which means the user U is looking in an upward direction relative to a horizontal direction) and for θ values not less than a predetermined angle P and less than 90° (which means θ falls within a range designated as R2 in the figure). In other words, when the user U is looking in an upward direction relative to a direction toward the feet of the user U, the image provision device 100 trims the all-surroundings image data into an image that is neither enlarged nor reduced.

The image provision device 100 sets the zoom factor to a value greater than 1 for θ values smaller than the predetermined angle P (which means θ falls within a range designated as R1). When θ falls within the range designated as R1, a greater value is given to the zoom factor for a smaller θ value. In other words, when the user U is looking in a direction closer to the feet of the user U, the image provision device 100 trims the all-surroundings image data into an image while enlarging the image. In particular, the image provision device 100 enlarges the image to a larger extent as the eye direction of the user U is closer to a vertically downward direction. In this way, the image provision device 100 can provide images that give a reduced feeling of strangeness to the user.

Figure 7:
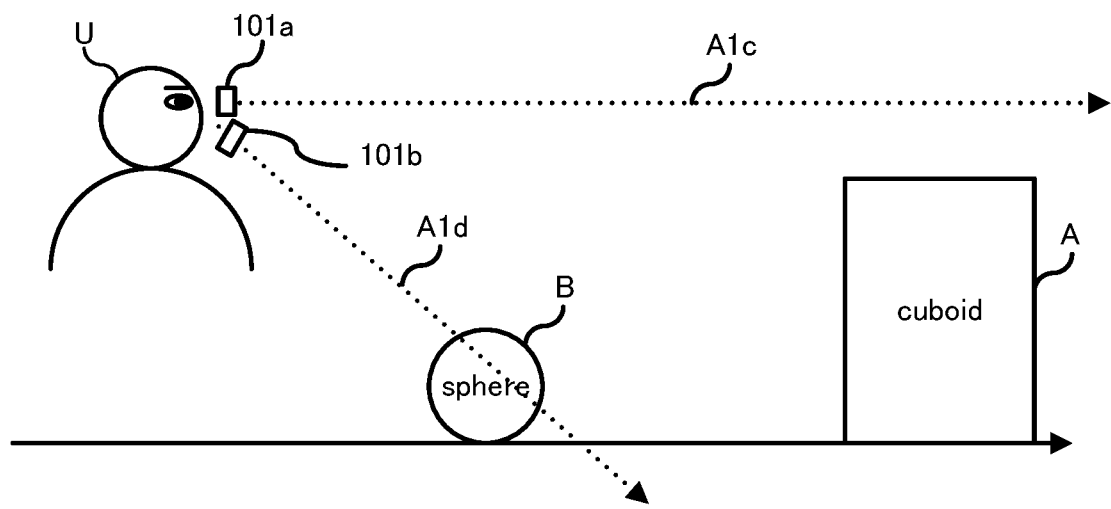
FIG. 7 is an explanatory diagram illustrating a positional relationship between the user and objects in a virtual space provided by an all-surroundings image.

Specific contents of an image provided by the image provision device 100 (that is, an image shown on the display 192) are described below with reference to FIGS. 7 to 9. FIG. 7 shows that objects (an object A and an object B) recorded in the all-surroundings image data 21 are expressed as being present in a virtual space. The object A is a cuboidal object present in the virtual space. The object B is a spherical object smaller than the object A in size and present closer to the user U.

Figure 8:
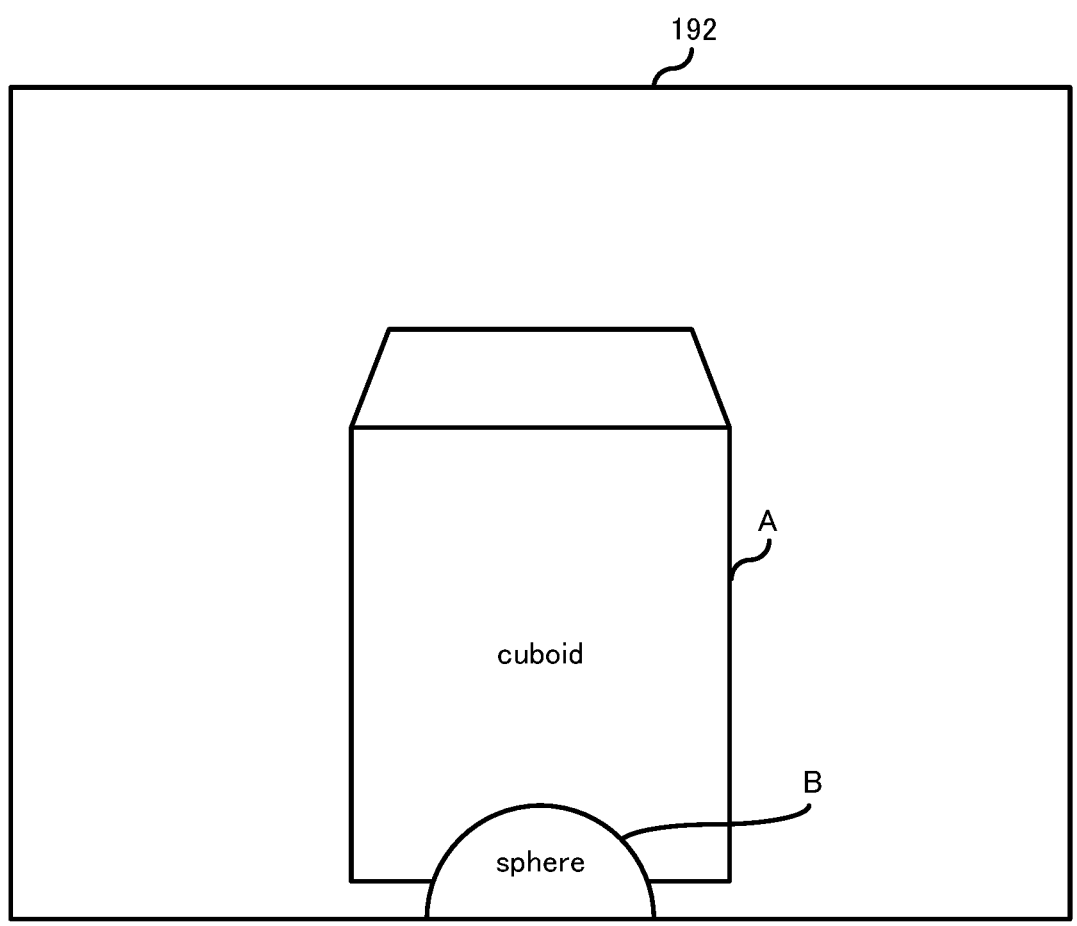
FIG. 8 illustrates an example of an image shown on a display.

When the user U is looking in a horizontal direction (that is, the direction indicated by the line A1c in FIG. 7), the image provision device 100 shows the image in FIG. 8 on the screen 101a of the display 192. In the image illustrated in FIG. 8, the object A and the object B are expressed on the image.

Figure 9:
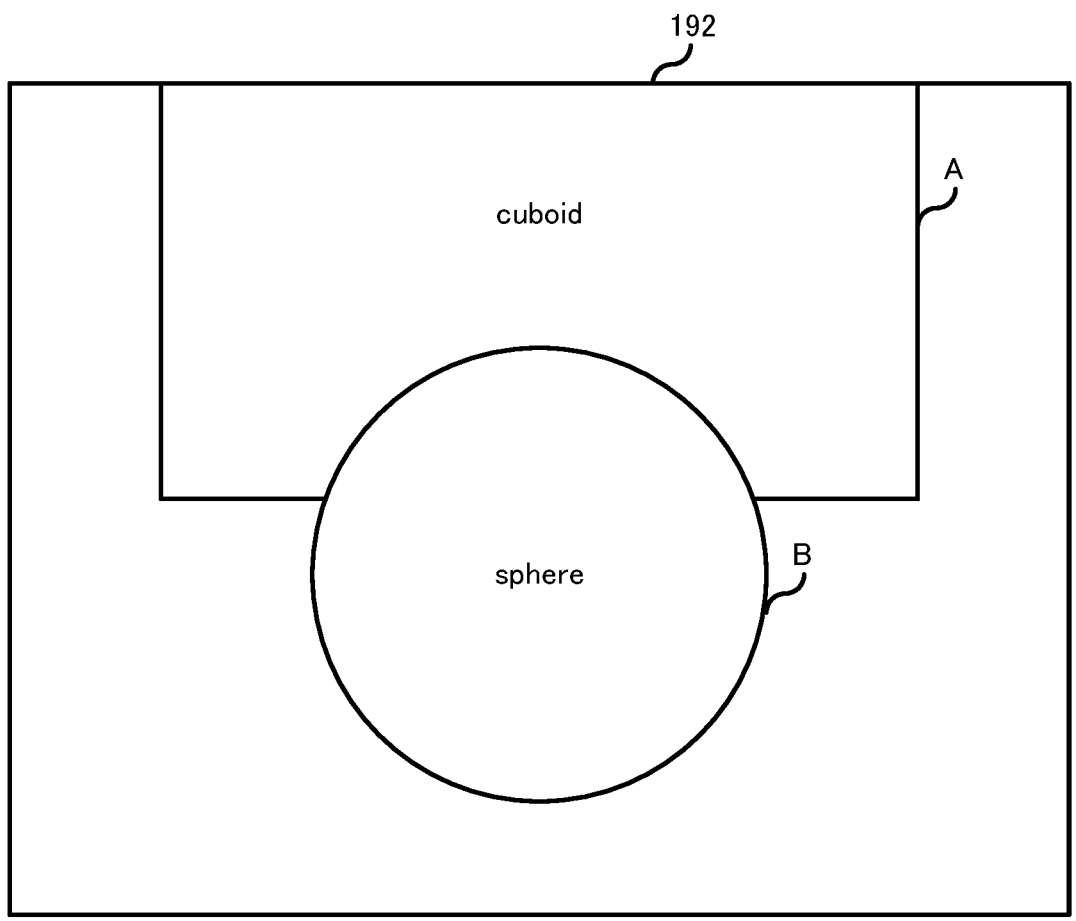
FIG. 9 illustrates an example of an image shown on a display.

When the user U is looking in a direction closer to the feet of the user U (the direction indicated by the line A1d in FIG. 7), the image provision device 100 shows the image in FIG. 9 on the screen 101b of the display 192. In the image illustrated in FIG. 9, the object A and the object B are also expressed on the image. Note that the objects expressed in FIG. 9 (the objects A and B) are rendered larger than the objects A and B, respectively, expressed in FIG. 8. This is because the image provision device 100 sets the zoom factor to a greater value and trims the all-surroundings image with the zoom factor when the eye direction of the user U is closer to a predetermined direction (a direction toward the feet).

In the embodiment described above, the image provision device 100 trims and zooms part of the all-surroundings image with a zoom factor that depends on an angle formed between the eye direction of the user U and the predetermined direction in the all-surroundings image. However, the image provision device 100 according to the present embodiment is not limited to the one described above, and thus the image provision device 100 may, for example, trim the image with a zoom factor that depends on a depth in the all-surroundings image, that is, the distance from the eye of the user U to an object recorded in the all-surroundings image.

Specifically, the all-surroundings image data handled by the image provision device 100 may include amounts of focus adjustment corresponding to individual eye directions (indices corresponding to the eye directions and indicating distances from the eye of the user U to objects recorded in the all-surroundings image). In this case, the all-surroundings image data holds not only images corresponding to the individual eye directions but also data indicating amounts of focus adjustment for the individual images.

Upon setting an eye direction to the all-surroundings image data in step S14 of the image provision process, the image provision device 100 obtains data indicating the amount of focus adjustment corresponding to the eye direction in the all-surroundings image data. Then, the image provision device 100 sets a zoom factor based on the obtained data that indicates the amount of focus adjustment.

Figure 6:
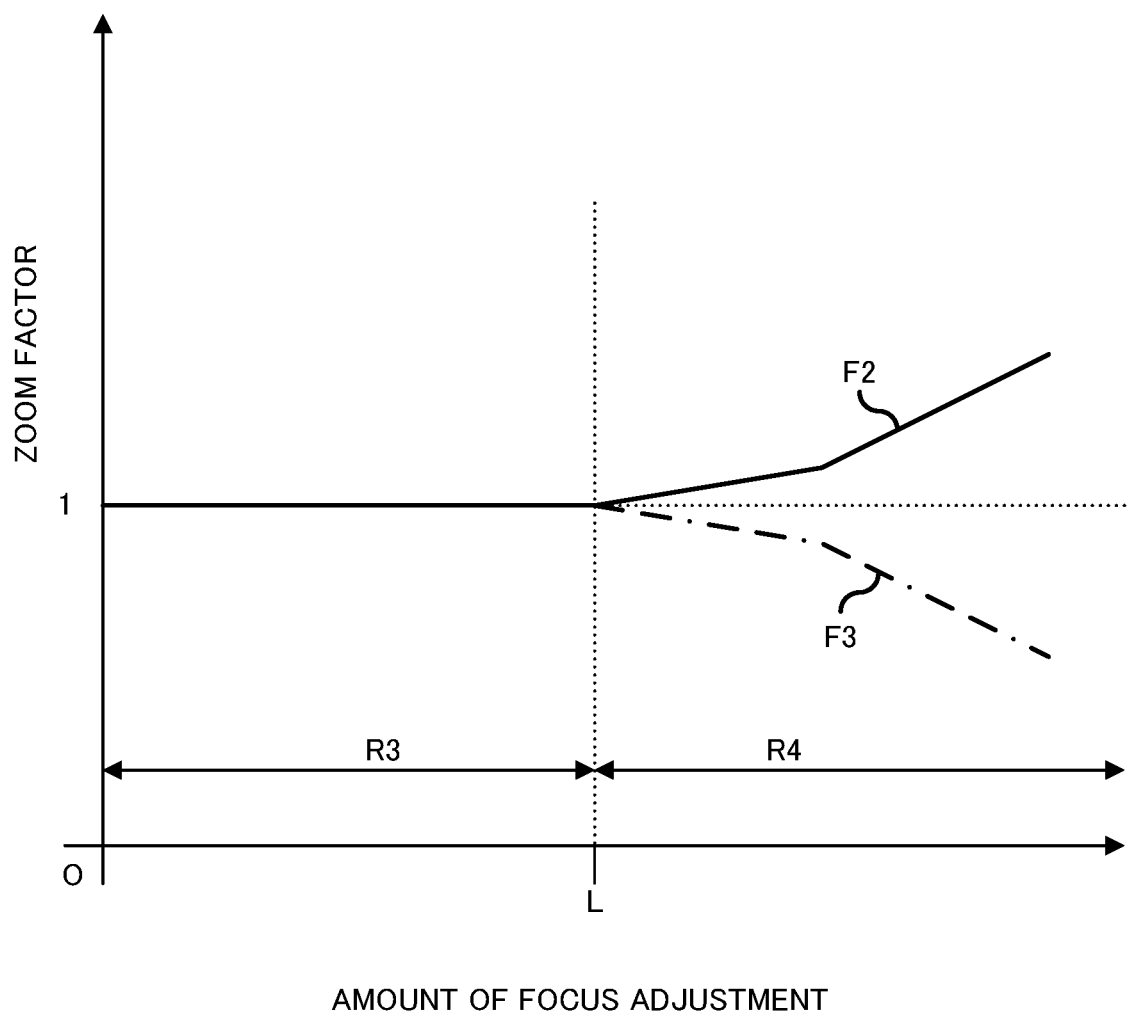
FIG. 6 illustrates an example of a correspondence between zoom factors and amounts of focus adjustment.

FIG. 6 illustrates an example of amounts of focus adjustment and zoom factors that are set based on the adjustment amount. In the example showing a function F2 in FIG. 6, the zoom factor is set to 1 for amounts of focus adjustment falling within a range up to a predetermined value L (the range designated as R3 in the figure). When the amount of focus adjustment falls within the range designated as R3, the image provision device 100 trims the image while neither enlarging nor reducing the image. On the other hand, when the amount of focus adjustment falls within a range beyond the predetermined value L (the range designated as R4 in the figure), the zoom factor is set to a value greater than 1; in particular, a greater value is given to the zoom factor for a larger amount of focus adjustment. When the amount of focus adjustment falls within the range designated as R4, the image provision device 100 trims the image using a higher zoom factor for a larger amount of focus adjustment.

As a result of the above-described process carried out by the image provision device 100, as long as the user U is looking at a region corresponding to a smaller amount of focus adjustment in the all-surroundings image, images are presented to the user U with the zoom factor unchanged irrespective of the orientation of the user's head. In contrast, when the user U is looking at a region corresponding to a larger amount of focus adjustment in the all-surroundings image, an image enlarged according to the amount of focus adjustment that is set for the eye direction is projected onto the display 192.

In general, a region corresponding to a smaller amount of focus adjustment is an image region showing a place closer to the user U in the all-surroundings image. Something closer to the user U is recorded in the all-surroundings image as a larger object, and thus can be seen easily by the user U with the zoom factor unchanged.

In contrast, a region corresponding to a larger amount of focus adjustment is an image region showing a place further away from the user U in the all-surroundings image. Accordingly, an object in such region is recorded in the all-surroundings image as a small object, and thus the user U may have difficulty in recognizing the object by appearance. The image provision device 100 enlarges an image of a region corresponding to a larger amount of focus adjustment to display the enlarged image, whereby the user U can recognize distant objects in the image with higher visibility.

Contrary to the example showing the function F2, the image provision device 100 may also set the zoom factor to a value less than 1 for a range having a larger amount of focus adjustment (the range designated as R4). In this case, the range designated as R4 has the zoom factor set to a smaller value for a larger amount of focus adjustment, as indicated by a function F3 in FIG. 6. In the example showing the function F3, the zoom factor is set to 1 in the range designated as R3.

In the case where the zoom factor is set in this way, the image provision device 100 trims, with a lower zoom factor, an image of a region corresponding to a larger amount of focus adjustment to display the resulting image on the display 192. In other words, when the user U turns the gaze on an image region showing a distant place, the display 192 presents an image covering a broader area. This can give the user U a greater sense of depth.

The image provision device 100 may additionally hold data indicating the body height of the user U, and may adjust the zoom factor based on a numerical value indicated by the data. In this case, the image provision device 100 may use a numerical value input by the user U. Alternatively, the image provision device 100 may include a mechanism by which the height of the head-mounted display 190 measured from the floor is detected and use such detected numerical value.

Various embodiments are possible for adjusting the zoom factor based on the data indicating the body height of the user U. For example, the data indicating the body height may be used to derive the function F1, which determines the zoom factor illustrated in FIG. 5. For example, the function may be derived for calculating the zoom factor by multiplying a certain function by (H1/170), where 170 represents a reference body height defined as 170 cm, and H1 represents the body height of the user U expressed as a numerical value in units of cm.

A server device according to an embodiment of the present disclosure can be implemented by using not only a special-purpose system but also a general computer system. For example, a program causing a computer to execute the above-described operations may be stored and distributed in a non-transitory computer-readable storage medium, such as a flexible disk, a compact disk-read only memory (CD-ROM), a digital versatile disk (DVD), or a magnet optical disk (MO), and the program may be installed on a computer system to form a source program analysis system for executing the above-described processes. In addition, the program may be stored in a disk device or the like included in a server device that is located on the Internet and the program may be, for example, superimposed on a carrier wave to be downloaded to a computer.

The image provision device according to an embodiment of the present disclosure may not necessarily be implemented by a single device. A plurality of computers sharing functions of the above-described individual components may constitute a single system providing these functions.

The foregoing describes some example embodiments for explanatory purposes. Although the foregoing discussion has presented specific embodiments, persons skilled in the art will recognize that changes may be made in form and detail without departing from the broader spirit and scope of the invention.

Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

11 Detector
12 Direction setter
13 Extractor
14 Displayer
21 All-surroundings image data
100 Image provision device
101 Screen
190 Field-of-vision covering display
191 Sensor
192 Display
U User

The invention claimed is:

1. An image provision device for displaying an image obtained from an all-surroundings image on a field-of-vision covering display, comprising:
   at least one memory configured to store computer program code;
   at least one processor configured to operate according to said computer program code, said computer program code including:
   detecting code configured to cause at least of the at least one processor to detect an orientation or a change in the orientation of a user;
   setting code configured to cause at least of the at least one processor to set an eye direction to the all-surroundings image, based on the detected orientation or change in the orientation;
   obtaining code configured to cause at least of the at least one processor to obtain a zoomed image by trimming part of the all-surroundings image with a zoom factor that depends on an angle formed between the set eye direction and a predetermined direction in the all-surroundings image and zooming the part of the all-surroundings image in accordance with a size or resolution of the display; and
   displaying code configured to cause at least of the at least one processor to display the obtained zoomed image on the display.

2. The image provision device according to claim 1, wherein the image provision device trims and zooms part of the all-surroundings image with the zoom factor that is higher as the angle formed between the set eye direction and the predetermined direction in the all-surroundings image is smaller.

3. The image provision device according to claim 1,
wherein an amount of focus adjustment corresponding to an eye direction is recorded in the all-surroundings image, and
wherein the image provision device trims and zooms part of the all-surroundings image with a zoom factor that depends on the angle and on the amount of focus adjustment corresponding to the set eye direction.

4. The image provision device according to claim 1,
wherein the image provision device trims and zooms part of the all-surroundings image with the zoom factor that depends on the angle and on a numerical value representing a body height of the user wearing the display.

5. The image provision device according to claim 1,
wherein the image provision device
detects a height of the display; and
trims and zooms part of the all-surroundings image with a zoom factor that depends on the angle and on the detected height.

6. An image provision method comprising:
displaying an image obtained from an all-surroundings image on a field-of-vision covering display,
detecting, by an image provision device, an orientation or a change in the orientation of a user,
setting, by said image provision device, an eye direction to the all-surroundings image, based on the detected orientation or change in the orientation,
obtaining, by said image provision device, a zoomed image by trimming part of the all-surroundings image with a zoom factor that depends on an angle formed between the set eye direction and a predetermined direction in the all-surroundings image and zooming the part of the all-surroundings image in accordance with a size or resolution of the display, and
displaying, by said image provision device, the obtained zoomed image on the display.

7. A non-transitory computer-readable information recording medium recording a program executed by a computer that displays an image obtained from an all-surroundings image on a field-of-vision covering display, the program causing the computer to:
detect an orientation or a change in the orientation of a user;
set an eye direction to the all-surroundings image, based on the detected orientation or change in the orientation;
obtain a zoomed image by trimming part of the all-surroundings image with a zoom factor that depends on an angle formed between the set eye direction and a predetermined direction in the all-surroundings image and zooming the part of the all-surroundings image in accordance with a size or resolution of the display; and
display the obtained zoomed image on the display.

* * * * *